(12) United States Patent
Williams et al.

(10) Patent No.: US 11,418,352 B2
(45) Date of Patent: Aug. 16, 2022

(54) CERTIFICATE AUTHORITY (CA) SECURITY MODEL IN AN OVERLAY NETWORK SUPPORTING A BRANCH APPLIANCE

(71) Applicant: Akamai Technologies, Inc., Cambridge, MA (US)

(72) Inventors: Brandon O. Williams, Revere, MA (US); Andres Guedez, Melrose, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 224 days.

(21) Appl. No.: 16/275,423

(22) Filed: Feb. 14, 2019

(65) Prior Publication Data
US 2019/0260599 A1 Aug. 22, 2019

Related U.S. Application Data

(60) Provisional application No. 62/633,371, filed on Feb. 21, 2018.

(51) Int. Cl.
*H04L 9/32* (2006.01)
*H04L 9/08* (2006.01)
*H04L 9/40* (2022.01)

(52) U.S. Cl.
CPC .......... *H04L 9/3268* (2013.01); *H04L 9/0894* (2013.01); *H04L 63/0209* (2013.01);
(Continued)

(58) Field of Classification Search
CPC ............. H04L 63/0281; H04L 63/0823; H04L 63/166; H04L 63/0884; H04L 63/0464;
(Continued)

(56) References Cited

U.S. PATENT DOCUMENTS 10,320,572 B2 * 6/2019 Rathinasabapathy ..... H04L 9/30
10,511,448 B1 * 12/2019 Brinskelle ............. H04L 63/166
(Continued)

*Primary Examiner* — Tae K Kim
(74) *Attorney, Agent, or Firm* — David H. Judson

(57) ABSTRACT

A method to generate a trusted certificate on an endpoint appliance located in an untrusted network, wherein client devices are configured to trust a first Certificate Authority (CA) that is administered by the untrusted network. In this approach, an overlay network is configured between the endpoint appliance and an origin server associated with the endpoint appliance. The overlay comprises an edge machine located proximate the endpoint appliance, and an associated key management service. A second CA is configured in association with the key management service to receive a second certificate signed by the first CA. A third CA is configured in association with the edge machine to receive a third certificate signed by the second CA. In response to a request from the appliance, a server certificate signed by the third CA is dynamically generated and provided to the appliance. A client device receiving the server certificate from the endpoint appliance trusts the server certificate as if the server certificate originated from the first CA, thereby enabling the endpoint appliance to terminate a secure information flow received at the endpoint appliance.

13 Claims, 5 Drawing Sheets

(52) U.S. Cl.
CPC ........ *H04L 63/0823* (2013.01); *H04L 63/166* (2013.01); *H04L 63/06* (2013.01)

(58) Field of Classification Search
CPC ..... H04L 63/06; H04L 9/3263; H04L 9/3268; H04L 9/0825; H04L 9/083; H04L 2209/76
See application file for complete search history.

(56) References Cited

U.S. PATENT DOCUMENTS

| | | | | |
|---|---|---|---|---|
| 2002/0073311 | A1* | 6/2002 | Futamura | H04L 9/007 713/157 |
| 2004/0103283 | A1* | 5/2004 | Hornak | H04L 9/3263 713/175 |
| 2006/0080352 | A1* | 4/2006 | Boubez | H04L 63/166 707/999.102 |
| 2013/0019093 | A1* | 1/2013 | Seidl | H04L 9/006 713/158 |
| 2013/0156189 | A1* | 6/2013 | Gero | G06F 16/2255 380/255 |
| 2014/0282482 | A1* | 9/2014 | Enns | H04W 52/00 717/172 |
| 2015/0067338 | A1* | 3/2015 | Gero | H04L 9/302 713/171 |
| 2015/0106624 | A1* | 4/2015 | Gero | H04L 63/166 713/171 |
| 2016/0094581 | A1* | 3/2016 | Kasbekar | H04L 63/0281 713/151 |
| 2017/0005805 | A1* | 1/2017 | Wang | H04L 9/3268 |
| 2017/0111323 | A1* | 4/2017 | Borkar | H04L 9/321 |
| 2017/0170973 | A1* | 6/2017 | Gill | H04L 63/0815 |
| 2017/0295132 | A1* | 10/2017 | Li | H04L 61/1511 |
| 2017/0331859 | A1* | 11/2017 | Bansal | H04L 67/10 |
| 2018/0041346 | A1* | 2/2018 | Rathinasabapathy | H04L 9/3268 |
| 2018/0060608 | A1* | 3/2018 | Holden | H04L 63/061 |
| 2018/0139059 | A1* | 5/2018 | Jaatinen | H04W 12/069 |
| 2018/0191709 | A1* | 7/2018 | Thayer | H04L 63/0281 |
| 2019/0028439 | A1* | 1/2019 | Moore | H04L 63/306 |
| 2019/0068622 | A1* | 2/2019 | Lin | H04L 63/1441 |
| 2019/0163468 | A1* | 5/2019 | Enns | H04L 67/125 |
| 2020/0204527 | A1* | 6/2020 | Vass | G06Q 20/3567 |
| 2020/0336316 | A1* | 10/2020 | Jain | G06F 9/45558 |
| 2020/0396088 | A1* | 12/2020 | Master | H04W 12/043 |

* cited by examiner

CERTIFICATE AUTHORITY (CA) SECURITY MODEL IN AN OVERLAY NETWORK SUPPORTING A BRANCH APPLIANCE

BACKGROUND

Technical Field

This application relates generally to overlay network routing over the publicly-routed Internet.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

A wide area network (WAN) is a telecommunications network e.g., with links across metropolitan, regional, national or international boundaries, that covers a broad geographical area, typically using leased telecommunication lines. Enterprises and government entities utilize WANs to relay data among employees, clients, buyers, and suppliers from various geographical locations. For example, a WAN commonly is used to connect local area networks (LANs) and other types of networks together, so that users and computers in one location can communicate with users and computers in other locations. Many WANs are built for one particular organization and are private. Other types of WANs include those built by Internet service providers, and these can be used to provide connections from an organization's LAN to the Internet. When a WAN is built using leased lines, a router positioned at each end of the leased line connects the LANs on each side to each other.

One common WAN approach using leased lines implements Multi-Protocol Label Switching (MPLS). MPLS is a standard-based technology for speeding up network traffic flow. In MPLS, a specific path (identified by a label) is set up for a given packet sequence, thereby obviating router look-up of a next address to which to forward the packet. MPLS works with various types of network protocols, such as IP, ATM and frame relay. While delivery over MPLS is efficient and secure, it also is expensive, primarily due to the cost of the leased line. As an alternative, WANs also can be built using less costly packet switching methods such as those that can take full advantage of the Internet's packet-switched network.

MPLS providers often must provide support for customers with branch offices that are not within reach of the provider's MPLS cloud. One common solution is for the MPLS provider to place VPN (IPsec) concentrators at the edge of their MPLS cloud. The provider may then provide the customer with a Customer Premises Equipment (CPE) device (e.g., a router) that will connect to a standard broadband Internet connection to connect to their MPLS services via the VPN concentrator. The number and location of the VPN concentrators, however, is often limited, resulting in varying performance depending on a branch office customer's location.

More generally, enterprises now desire to effectively utilize Internet links as an optimized wide area network (WAN), connecting branches, data centers, teleworkers and mobile users to applications over the Internet. Driven also by the impact of cloud computing and mobility, enterprises need a network service that can deliver an optimal and predictable cloud experience to users, preferably a network that is low-cost, easy-on, and global with security and optimization built-in.

BRIEF SUMMARY

A method to generate a trusted certificate on an endpoint appliance located in an untrusted network, wherein client devices are configured to trust a first Certificate Authority (CA) that is administered by the untrusted network. In this approach, an overlay network is configured between the endpoint appliance and an origin server associated with the endpoint appliance. The overlay comprises an edge machine located proximate the endpoint appliance, and an associated key management service. A second CA is configured in association with the key management service to receive a second certificate signed by the first CA. A third CA is configured in association with the edge machine to receive a third certificate signed by the second CA. In response to a request from the appliance, a server certificate signed by the third CA is dynamically generated and provided to the appliance. A client device receiving the server certificate from the endpoint appliance trusts the server certificate as if the server certificate originated from the first CA, thereby enabling the endpoint appliance to terminate a secure information flow received at the endpoint appliance.

Preferably, the server certificate has a time-to-live (TTL) that is shorter than a TTL associated with the third CA. Further, preferably the TTL associated with the third CA is shorter than a TTL associated with the second CA, and the TTL associated with the second CA is shorter than a TTL associated with the first CA. With the trust hierarchy in place, the risk associated with compromise of a certificate in a lower level of the hierarchy is significantly reduced due to the lower TTL.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
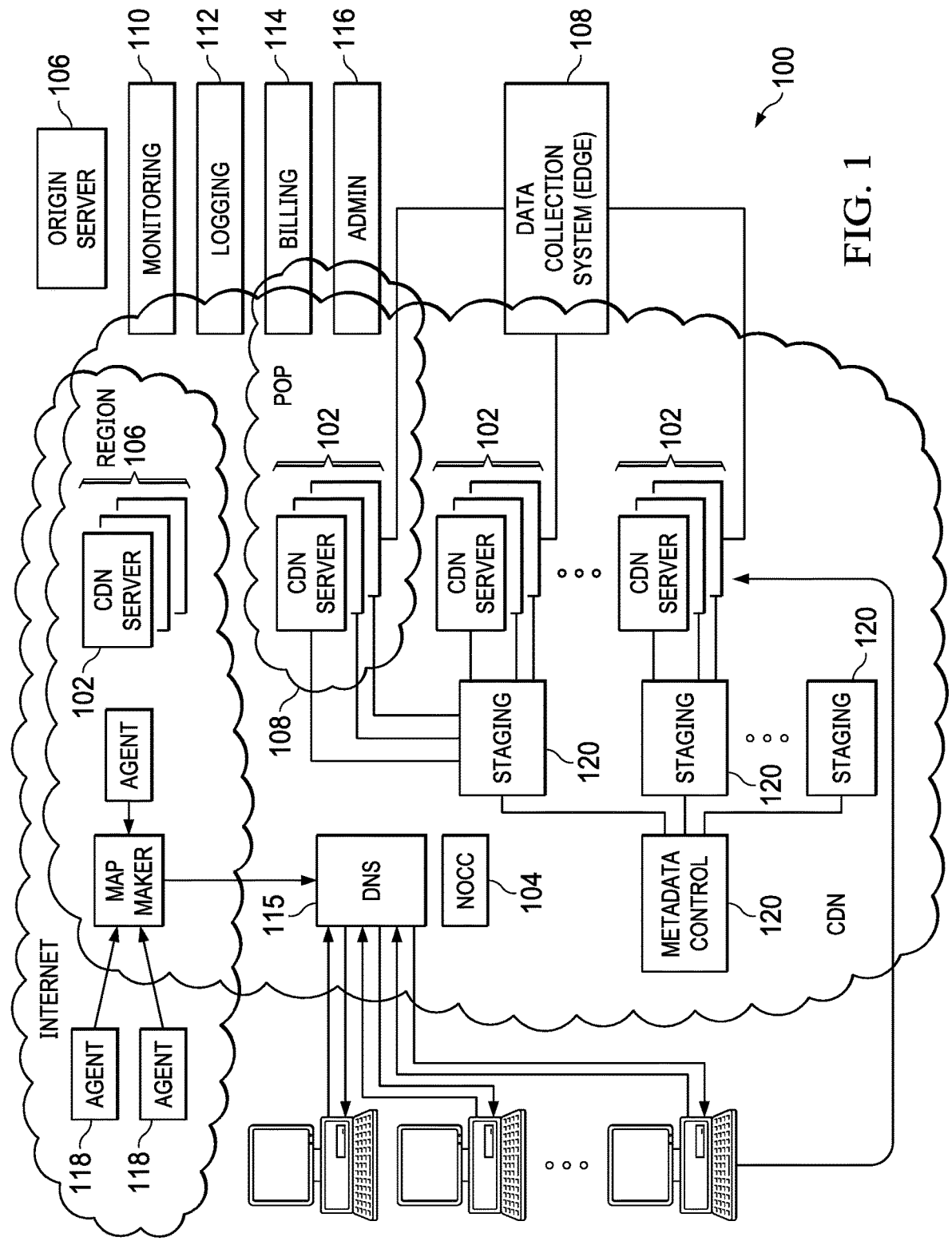
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
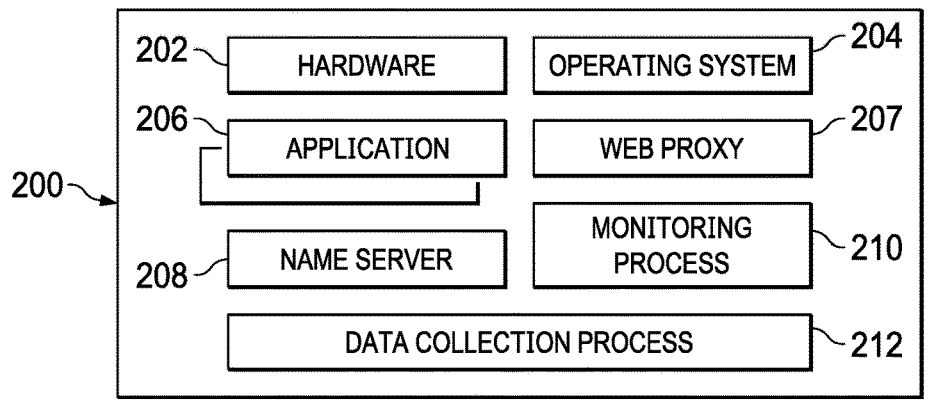
FIG. 2 is a representative CDN edge machine configuration.

As illustrated in FIG. 2, a given machine 200 in the content delivery network comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine may include one or more media servers, such as a Windows Media Server (WMS) or Flash server, as required by the supported media formats, or it may utilize HTTP-based delivery of chunked content fragments that constitute a stream.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

By way of further background, CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud. To accomplish these two use cases, CDN software may execute on virtual machines hosted in one or more customer data centers, and on virtual machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there, as well as to enable gathering of security event data and the application of security policy (e.g., based on that data). The CDN itself typically provides CDN hardware hosted in CDN data centers to provide a gateway between the nodes running behind the customer firewall and the service provider's other infrastructure (e.g., network and operations facilities. This type of managed solution provides an enterprise with the opportunity to take advantage of CDN technologies with respect to their Company's intranet.

As an overlay, the CDN resources such as described above also may be used to facilitate wide area network (WAN) acceleration services between enterprise data centers (which may be privately-managed) and third party software-as-a-service (SaaS) providers. The following provides additional details regarding this type of solution.

Figure 3:
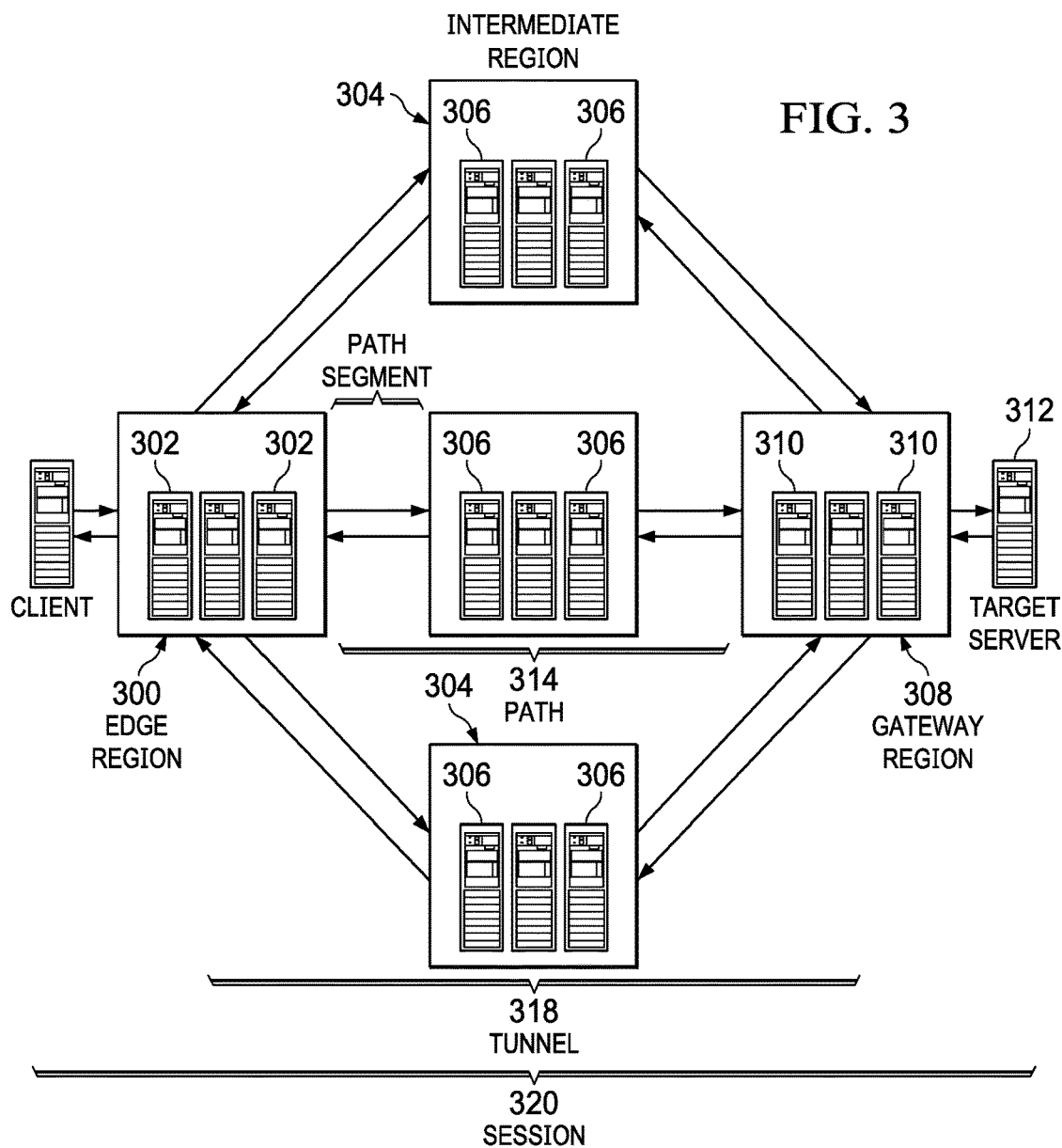
FIG. 3 illustrates a known "overlay" network solution whereby an "overlay" is positioned on top of the publicly-routable Internet.

In particular, FIG. 3 illustrates a known "overlay" network solution whereby an "overlay" is positioned on top of the publicly-routable Internet. This architecture is sometimes referred to as a "routing overlay" or "routing overlay network." The routing overlay network may leverage existing content delivery network (CDN) infrastructure, such as the infrastructure shown in FIGS. 1-2 above, and as provided by commercial services providers such as Akamai Technologies, Inc. of Cambridge, Mass. An overlay network of this type provides significant performance enhancements for any application that uses Internet Protocol (IP) as a transport protocol by routing around down links or finding a path with a smallest latency. As is well known, the Internet Protocol (IP) works by exchanging groups of information called packets, which are short sequences of bytes comprising a header and a body. The header describes the packet's destination, and Internet routers use this address to pass the packet along until it arrives at its final destination. The body contains the application data. Typically, IP packets travel over Transmission Control Protocol (TCP), which provides reliable in-order delivery of a stream of bytes. TCP rearranges out-of-order packets, minimizes network congestion, and re-transmits discarded packets.

Many of the machines in the overlay are servers located near the edge of the Internet, i.e., at or adjacent end user access networks. As has been described above, e.g., FIG. 1, third party web sites and application providers offload delivery of content and applications to the network, which operates as a managed service. The overlay network includes distributed infrastructure for data collection, monitoring, logging, alerts, billing, management and other operational and administrative functions. As has been described and as shown in FIG. 2, a typical CDN machine comprises commodity hardware (e.g., an Intel® Pentium® processor) running an operating system kernel (such as Linux™ or variant) that supports one or more applications. To facilitate content delivery services, for example, given machines typically run a set of applications, such as an HTTP Web proxy, a name server, a local monitoring process, and one or more data collection processes. The Web proxy includes or has associated therewith an edge server manager process to facilitate one or more functions associated with the content delivery network.

A known OIP (Overlay Internet Protocol) routing mechanism comprises a representative set of components, as illustrated in FIG. 3:

edge server 302—typically, a CDN edge server running an OIP edge server software process (oidp) as described below. As will be described, this software is responsible for receiving, encapsulating and forwarding IP packets.

edge region 300—typically, a CDN edge region configured for the overlay mechanism.

intermediate server 306—typically, a server that receives encapsulated packets from an edge region 300 or other intermediate servers and forwards them on to other intermediate servers or to a gateway region.

intermediate region 304—a region of intermediate servers.

gateway server 310—typically, an edge server that has been configured to receive encapsulated packets from the overlay, and that applies source network address translation (NAT) to the original packets and forwards them onto the target server.

gateway region 308—typically, a type of edge region comprising gateway servers and that is usually deployed on customer premises.

Target server 312—a machine whose traffic is to be tunneled through the overlay.

target address—the IP address of the target server; this address is sometimes referred to as a direct address when being compared to a CDN virtual IP address.

slot—a single "instance" of the overlay; preferably, a slot is a numbered index that corresponds to a single target address.

virtual IP address—typically, a CDN address that corresponds to a slot; preferably, there is one virtual IP address per edge region per slot. It is sometimes referred to as a VIP.

path 314—an ordered set of CDN regions between an edge region and a gateway region.

path Segment 316—a single hop of a path.

tunnel 318—a set of one or more paths from an edge server to a gateway server.

session 320—A single end-to-end connection from the client 322 to the target server; preferably, the session is defined by a five tuple (IP payload protocol, source address, destination address, source port, destination port). The source is the client and the destination is the target.

Figure 4:
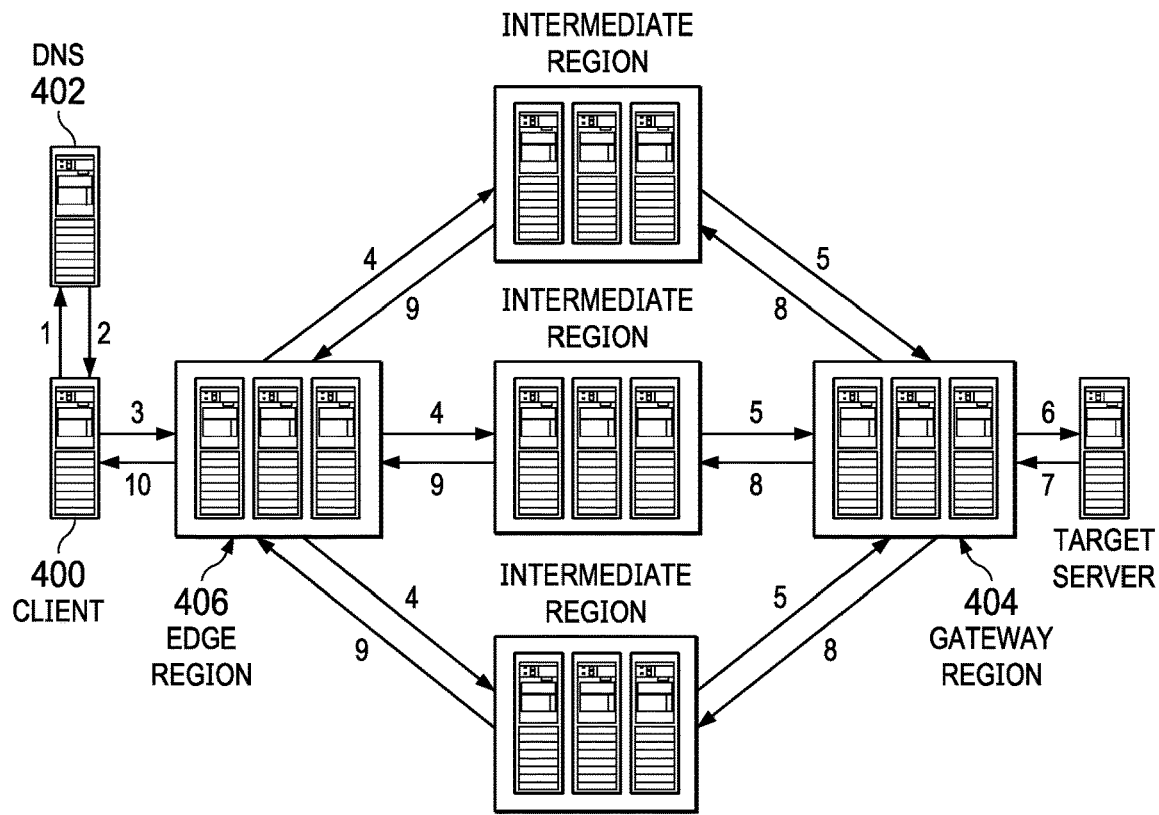
FIG. 4 depicts a use case in which an edge server in an overlay network edge region sends out multiple copies of encapsulated packets along multiple paths to facilitate an interaction between a requesting client and a target server.

In one known use scenario of the overlay network, one or more clients desire to send packets to a single IP address. This is illustrated in FIG. 4 and is now described. At step 1, the client 400 makes a DNS request to resolve a hostname, typically a hostname associated with a web-accessible application. This hostname is aliased (e.g., by a CNAME) to a domain that is being managed by an authoritative DNS 402; typically, the authoritative DNS is managed by the CDN service provider. Preferably, this hostname corresponds to a single gateway region (and target address) 404. This is also referred to as a slot, as described above. At step 2, the DNS query returns a single IP address for the hostname. This address identifies a best performing available edge region 406 and, preferably, that region is dedicated to the hostname. The address is referred to as a virtual IP address, as described above. At step 3, the client 400 begins to send IP packets to the virtual IP address. These packets are received by a server in the edge region 406. The edge region 406 knows the gateway region 404 to which to send the packets based on the destination address in the IP packet header. The packet is then encapsulated. At step 4, and based on routes preferably provided by a CDN mapping system, the edge server in the edge region 406 sends out multiple copies of the encapsulated packets along multiple paths. One technique for performing this multiple path packet transport operation is described in U.S. Pat. Nos. 6,665,726 and 6,751,673, assigned to Akamai Technologies, Inc. As illustrated at step 5, several intermediate servers receive the encapsulated packets and forward them (either directly, or through other Intermediate Regions, not shown) to the gateway region 404, once again, preferably based on routes provided from the CDN mapping system. At step 6, the packets are received by a server in the gateway region 404, where duplicates are removed. Destination NAT translates the virtual IP to the target address and source Network Address Port Translation is applied to the packet before it is sent, so that the return traffic will also be sent over the overlay network. Preferably, information is stored so that return traffic is sent to the edge region 406 from which the client packet originated. At step 7, the gateway region 404 receives an IP packet from the target address and de-NATs the packet. The packet is then encapsulated. At step 8, multiple copies of the packet are sent along multiple paths. At step 9, the intermediate servers send the packets back to the original edge region for this session. At step 10, the packets are received by an edge server and duplicates are removed. The packet is sourced from the virtual IP address and then sent back to the edge region.

The various connections used in the overlay network and as described typically are secured via SSL or other transport layer security (TLS) techniques.

A virtual private network (VPN)-as-a-service (or more generally, "network-as-a-service") can be facilitated using an overlay IP (OIP) routing mechanism such as shown in FIG. 3. The notion of networking "as a service" enables enterprises to effectively utilize Internet links as an optimized wide area network (WAN), connecting branches, data centers, teleworkers and mobile users to applications over the Internet. Driven by the impact of cloud computing and mobility, enterprises need a network service that can deliver an optimal and predictable cloud experience to users, preferably a network that is low-cost, easy-on, and global with security and optimization built-in.

Figure 5:
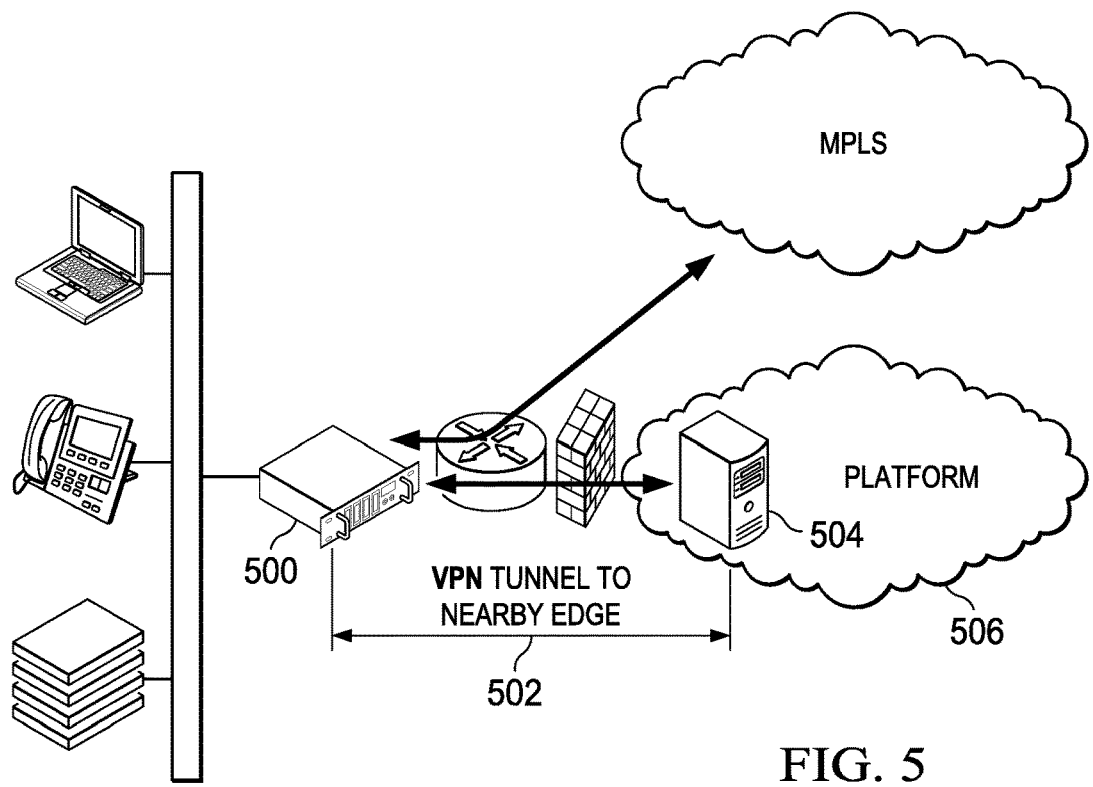
FIG. 5 illustrates how an overlay network appliance at one endpoint establishes a secure logical VPN tunnel to a nearby edge region or regions of the overlay network.

FIG. 5 illustrates how an overlay network appliance 500 at one endpoint establishes a secure logical VPN tunnel 502 to a nearby edge region or regions 504 of the overlay network 506. In this context, the network appliance 500 typically provides IPSec-based authentication and flow-based encryption, and the secure logical VPN tunnel 502 may incorporate one or more encrypted flows. Preferably, the edge 504 uses communications (e.g. keep-alive signaling) to maintain the tunnel through the enterprise firewall 508. When the overlay network customer desires to connect its local (inside the firewall) network, it can use the Internet-based overlay by having the appliances positioned at or adjacent to each endpoint when the local network connects to the Internet.

A description of this network-as-a-service approach is provided in U.S. Publication No. 2015/0188943.

The above-described platform allows an overlay network's enterprise customers to use the overlay network for network, transport, and application layer optimization of enterprise web traffic, regardless of whether or not the desired content is served by the overlay network service provider.

Cloud Connection Branch Appliance

With the above as background, the following describes further enhancements that leverage the above-described system. In this approach, an appliance (typically hardware, but may also be a virtual machine) is deployed behind the firewall at the customer's branch locations. The appliance (typically on-premises) provides application layer optimization for HTTP and HTTP/S, along with Quality-of-Service (QoS) for all Internet traffic to protect the branch's Internet uplink capacity for high priority applications. Preferably, the appliance also provides traffic interception capability, sometimes in conjunction with a basic connector IPsec configuration on the branch router, to deliver Internet traffic to an edge in the overlay network. Preferably, the overlay network edge provides a wide area network (WAN) side of the application layer optimization stack, together with other functions, such as a secure web gateway (SWG) capability that provides traffic classification via both URL and content inspection, virus/malware scanning, and user/group content access controls.

As previously described, an overlay network edge typically connects forward to other overlay network services for delivery of overlay network-supported customer content, as well other internet content. Content that is served the overlay network typically is served directly from a nearby edge region, while content that is not served by the service provider will use the OIP overlay and existing edge regions to go forward to an origin (e.g., a third party origin server). As will be described, the appliance also provides man-in-the-middle (MITM) termination of Transport Layer Security (TLS) flows that are intended for a third party origin server.

In operation, a client's connection preferably is transparently intercepted by the on-premises appliance. Both the TCP connection and the TLS session are terminated on appliance, preferably using dynamically-generated keys with certificates (certs) signed by a customer-specific Certificate Authority (CA), thereby allowing the appliance to view the content in plaintext for application identification and content optimization. The appliance then connects forward to the overlay network edge with a new TLS session, which is possibly encapsulated in IPsec from the router to the edge. At the overlay network edge, preferably the TCP and TLS are terminated again to allow the edge to perform content optimization, filtering, and virus/malware scanning. The overlay network edge then determines how to go forward to the origin, namely, via an edge server (HTTP proxy) for content being delivered by the overlay network itself (e.g. as a CDN), over OIP (as described above) to optimize non-customer content, or direct for content that is either not configured for optimization or too close for OIP to help. Preferably, the forward connection has an independent TLS session through to either the overlay edge server process or the origin, and for OIP optimized content, the TCP connection (not TLS) is terminated on a remote edge.

In an alternative embodiment, and when a "basic connector" IPsec tunnel is configured, HTTP/S use cases are supported even where the appliance is not deployed, in which case the first TCP/TLS connection (TCP1+TLS1) terminates at the overlay network edge.

When deployed, preferably certain security considerations are enforced with respect to the appliance. In particular, the appliance preferably does not depend upon or is allowed access to the overlay network's CDN-related services (e.g., customer metadata, origin hostnames, cryptographic keys, etc.) In the usual case, the appliance is not able to transparently segment TLS connections for unprepared client devices or applications; in other words, the client should be required to perform some action to install the customer-specific appliance root CA for transparent segmentation to be enabled. Also, preferably the appliance is treated as untrusted by the overlay network platform with restrictions with respect to certain overlay network data channels (e.g., customer metadata, data collection and reporting, etc.) to thus limit the information the appliance can access and publish.

Preferably, there are two (2) primary means of connection interception: the appliance and basic connector. In the case of HTTP/S flows that are handled by the appliance for application layer optimization, the appliance preferably sends TCP connections directly to the overlay network edge. In the case of IPsec flows (either to a service provider's MPLS gateway or an enterprise data center), a basic connector is a configuration on the customer's router that is used to deliver IPsec packets to the overlay network edge. The basic connector can also be configured in the presence of the appliance to ensure that HTTP/S traffic continues to go through the edge (and thus the SWG function) in the event of appliance failure.

In one embodiment, an initial on-ramp from the appliance to an overlay network uses multiple forward TLS connections instead of IPsec tunnels like the basic connector. Some branch office firewalls have UDP ports blocked, which means the appliance on-ramp must be TCP-based. Unlike an IPsec tunnel that multiplexes a number of flows, the TLS on-ramp approach preferably utilizes several forward TLS connections to the overlay network edge. Each client connection preferably owns a forward TLS connection in a 1:1 mapping. This is preferred over multiplexing multiple client connections inside of a single forward TLS connection to prevent head-of-line (HOL) blocking and to also improve transport characteristics.

As part of appliance startup, preferably the appliance authenticates with another overlay network device/service, such as a management gateway (MG), which typically is an edge machine that provides a control plane for enterprise appliances. In this approach, preferably the appliance authenticates with the MG using an on-board secure processing environment (TPM). Use of the TPM to authenticate forward TLS connections typically is not feasible due to the frequency of forward connections being made. Instead, preferably the appliance performs mutual authentication with the overlay network edge. To this end, preferably a service Root CA certificate is installed on the appliance during software installation. This is used to verify the overlay network edge server certificate. For client certificates, and as will be described, preferably the appliance has a mechanism to create a certificate and have it signed via a Certificate Signing Request (CSR) handled by the edge over a TPM-secured connection (see TLS Session Termination as described below). To protect the private key associated with the appliance identity certificate, preferably it is sealed in the TPM and, as necessary, unsealed into the memory space of the process initiating the TLS session to the MG.

To gain visibility into underlying protocols (e.g., to facilitate application layer optimizations), client-initiated TLS sessions preferably are terminated by the appliance device, which transparently intercepts data at a branch, or by the overlay network receiving data via an IPsec tunnel, when the appliance is not deployed. This process of transparent interception and termination of TLS sessions is referred to below as man-in-the-middle (MITM) termination. To end users, the process is transparent and unobtrusive. In one embodiment, overlay network customers deploy a trusted CA certificate—the root of a MITM certificate trust chain—to user devices/machines. Once the CA is installed in a private trust anchor store, browsers and other TLS clients should not display unknown certificate issuer warnings when MITM certificates are presented during the TLS handshake.

Workflows for provisioning and management of the root CA are outlined in detail within the Secret Distribution section that follows below.

The following section outlines a mechanism for dynamic generation of MITM certificates. Typically, a decision to terminate a TLS session is made based on one or more policy rules, e.g., rules configured by enterprise administrators via the overlay network extranet portal. Policy rules may include optimization stanzas to enable application layer optimizations, such as HTTP caching and deduplication, and security stanzas to enable Secure Web Gateway (SWG) functionality. Web properties marked for TLS MITM preferably are checked against a blacklist enforced at the edge (prior to CSR signing), to prevent visibility and caching of sensitive content.

Preferably, the appliance transparently intercepts Internet bound data flows at a customer's branch office. A policy engine running in the appliance evaluates a flow based on optimization and security rules, preferably as configured by enterprise administrators and then instantiated on the device. These rules typically are configured with matches on Layer 3-7 identifiers, such as IP addresses/ports and hostnames. Along with Layer 3 attributes, application layer protocol fields such as the SNI (Server Name Identification) extension and HTTP Host header may be matched against the rules. If SNI is missing, other fields (e.g., CN/SAN) from an origin server's certificate may be checked as well. When a match is found for a policy which requires visibility into application layer protocols, if the flow is classified as TLS, it is marked as a candidate for TLS MITM termination. Preferably, and as mentioned, the appliance does not have access to private keys corresponding to any MITM CAs. Therefore, once a flow is marked for MITM processing, the device checks a local MITM certificate cache for an already provisioned certificate for the target origin. If not found, the appliance initiates a remote provisioning mechanism through an edge delegation service or mechanism. At a high level, the edge delegation service mechanism involves creating a CSR on the device, sending it to the overlay network edge to be signed by the customer's MITM CA, and receiving a response with a signed, short-lived certificate. In one embodiment, this provisioning may occur as follows.

First, the appliance obtains a Server Certificate from the origin server and stores metadata (Common Name (CN), Subject Alternative Name (SAN), critical extensions) required to generate MITM CSR. Then, the appliance creates a CSR based on the metadata obtained, and signs it with a TPM quote operation (providing an attestation that a device with a valid overlay network TPM is requesting the certificate). The appliance then sends the CSR only (the associated private key is not sent) to the overlay network edge (NE) over a mutually-authenticated TLS on-ramp connection. The CSR is received by the NE and verified using a public AIK (Attestation Identity Key) associated with the device. A blacklist is checked by the NE to prevent MITM of PII sensitive sites, such as banking and healthcare providers. If a match is found, an error is returned the appliance. The NE checks a local cache (preferably in-memory only) for a short-lived MITM $CA_{\{ak\}}$'s certificate key pair for the customer associated with the device. If not found, the NE requests the MITM $CA_{\{ak\}}$'s certificate-key pair from a service Key Management Infrastructure (KMI) using one or more existing APIs. Once the signing certificate-key pair is available, the CSR is signed and the resulting MITM certificate is returned to the appliance device via the already established communication channel. The device adds the certificate to its local in-memory cache, and there-after proceeds to use the MITM server certificate-key pair to terminate any pending TLS sessions for the target origin.

Forward connections to the origin should verify the server certificate presented, based on various configurable parameters available to customers. A default CA trust store may be populated with the union of CAs trusted by major browser vendors (Firefox, Google Chrome, Safari) with exceptions made for CAs not considered trustworthy. Preferably, customers are allowed to add/remove CAs from the default set based on their own security preferences.

For MITM visibility, preferably HTTP headers are appended to both request and response when a TLS session is subject to MITM. On the request side, the header notifies the edge cache engine that the HTTP flow was previously encapsulated in TLS (and therefore originally HTTPS). Also, a configurable header can be added to the forward (origin) request, to notify the origin that the appliance is acting as a transparent proxy between the client browser and content provider. On the response side, a configurable header may be used to notify the client browser that the HTTPS session was terminated by the appliance.

Secret Distribution—Security Model

To support TLS segmentation (MITM), customer-specific CA certificates and associated private keys preferably are stored in KMI (an overlay network key management infrastructure) and distributed to overlay network edge machines. These CA certificates are used to sign CSRs for dynamically-generated TLS MITM certificates. According to this disclosure, a goal of the distribution strategy for these secrets is to segment certificates and private keys by their TTLs. Preferably, only long-lived secrets are stored in KMI and never distributed to edge machines or appliance devices. Short-lived CA certificates and keys are distributed to edge machines, but not to the appliances. Dynamically-generated server certificates are signed by edge machines and pushed to the appliance devices as necessary.

Preferably, overlay network edge machines are located within secure racks at data centers, providing physical security properties. Preferably, customers are responsible for physical security of the appliances at their branch locations. Compromise of an appliance to an attacker will expose TLS MITM certificates and keys for that customer/device, along with any cached (object and deduplication) content on the device. Standard attack mitigation mechanisms, such as traffic rate limiting, authentication token revocation, and secure programming practices preferably are implemented by the OIP edge server software to protect against damage from compromised devices.

Once a compromised device is detected, access to OIP service control and data plane networks is revoked. The device's dynamic certificate generation capabilities cease to function, and TLS MITM termination using provisioned server certificates is limited to a timeframe bounded by the TTL of the certificates, which is expected to be very short.

Figure 6:
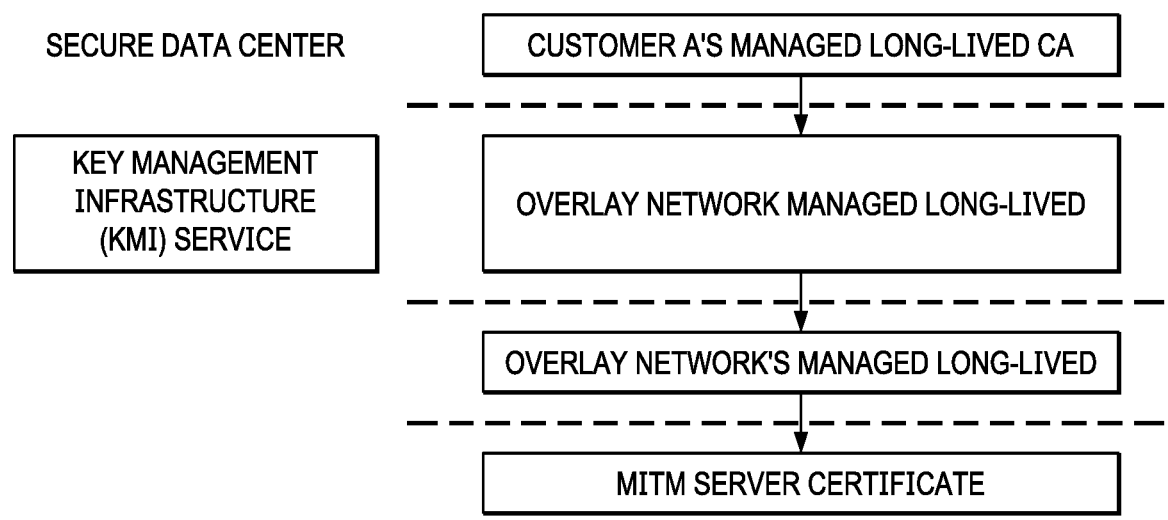
FIG. 6 depicts a representative Certificate Authority (CA) certificate hierarchy for MITM Certificates according to this disclosure.

The following provides additional details regarding the above-described security model. As used herein, TLS refers to Transport Layer Security, an Internet standard. CSR refers to a Certificate Signing Request. CA refers to a Certificate Authority. A long-lived CA Certificate is a Certificate with a long TTL, e.g., greater than one month. A short-lived CA Certificate is a Certificate create with a TTL less than that period, e.g., less than one month. A Short-lived Server Certificate is a Certificate created with a relatively short TTL, e.g., less than one day. Of course, these time periods may be varied. FIG. 6 depicts a preferred CA Certificate Hierarchy for MITM Certificates, as well as a Key Management Infrastructure (KMI) associated with the overlay network, and that provides a key management service. KMI operates out of a secure data center.

Preferably, there may be several workflows supported (e.g., by the overlay network customer portal, typically a web-based secure extranet application) to create and manage a customer-specific CA certificate hierarchy used for TLS man-in-middle termination. In a first workflow, a customer-owned CA is used as the root of trust. To create an overlay network provider-managed long-lived subordinate $CA_{\{ak\}}$, the portal generates a CSR for the subordinate and makes it available to the customer, e.g., via a portal front-end API used for signing with the customer's internal CA. The signed $CA_{\{ak\}}$ certificate is uploaded to the overlay network via the same mechanisms. The portal verifies the uploaded certificate is not signed by a globally trusted CA certificate (i.e., the CA's certificate chain is checked against CA certificates trusted by major browser vendors.) In a second alternative workflow, and for customers that already have the necessary PKI infrastructure in place, the portal creates a root of trust CA for that customer. The long-lived $CA_{\{ak\}}$ certificate is made available to the customer for download, with the expectation that it will be added as a trusted CA to the appropriate client software within the enterprise environment. In either case, once the long-lived $CA_{\{ak\}}$ is obtained by the portal, via either of the workflows above, it is added to a KMI collection, e.g., via a KMI REST API, using a well-defined naming template that includes a customer identifier. As noted, according to the security model, preferably the private key for long-lived $CA_{\{ak\}}$ is ever only hosted on KMI (or other secured) machines. Other overlay network machines never subscribe to receive $CA_{\{ak\}}$'s private key. After the customer has provisioned a long-lived $CA_{\{ak\}}$, it must ensure its machines trust certificates signed by it (or a subordinate) by pushing its own CA as a trusted CA to client machines (workflow 1), or to the overlay network provider managed CA (workflow 2). Once this is done, the customer activates $CA_{\{ak\}}$ via the portal. The activation triggers the portal to issue a request to KMI for creation of a subordinate short-lived $CA_{\{ak\}}'$ to be signed by $CA_{\{ak\}}$. Automatic rotation of the certificate preferably is enabled in KMI.

When an overlay network edge machine receives a MITM CSR from an appliance device (refer to TLS Session Termination section below for details), a KMI subscription is triggered for the $CA_{\{ak\}}'$ certificate and private key corresponding to that customer. This certificate and private key are then used to sign the dynamically-generated CSRs until it is rotated by KMI, or until a staleness TTL expires and the machine unsubscribes from the KMI definition. Dynamically-generated MITM server certificates preferably are not stored in KMI. The short lived CA certificate preferably is rotated often.

As also noted, MITM CA certificates and private keys are not pushed to the appliance devices. Rather, preferably all dynamic MITM server certificate signing is done on edge machines, and the resulting certificate is then sent to the device.

To rotate the root of trust CA, the customer follows the same provisioning workflows such as were described above. Once the new $CA_{\{ak\}}$ is activated, the customer should wait a given time period (e.g., 24 hours) prior to removing the old/rotated RoT CA from the trusted CA storage of its devices. This is ample time to allow MITM server certificates signed by the previous $CA_{\{ak\}}'$ to expire, and for new certificates to be created and signed with the newly created $CA_{\{ak\}}'$.

Certificate revocation may be carried out as follows. In particular, there are several different scenarios when revocation of a CA in the MITM certificate chain is required. When the root CA is owned by the customer, revocation can be handled by the customer, e.g., via an OCSP or a CRL, given that the root CA certificate contains the Authority Information Access and CRL Distribution Point extensions. Prior to, or after revocation of the root CA, the customer goes through the provisioning workflow to issue new overlay network CAs. If OCSP or CRLs are not in use for the root CA, the customer has several options: provision new overlay network CAs, and wait for already created short-lived MITM server certificates to expire, or notify the overlay network provider that the root certificate is compromised, in which case the network can revoke its subordinate CAs via KMI. When an OIP-managed CA must be revoked, the process preferably is as follows. When CA is the root CA for MITM certificates: start the provisioning workflow to issue new MITM CAs, revoke the CA in KMI, if not initiated by the customer, then notify the customer that this process has started, after which the customer downloads a new root CA and pushes it to the devices. If CA is the subordinate $CA_{\{ak\}}'$: rotate the CA, and revoke the old CA in KMI.

When a CA is revoked in KMI, it will be marked as inactive. Preferably, edge machines will periodically check the status of $CA_{\{ak\}}$ and $CA_{\{ak\}}'$ when MITM CSR requests are processed for a customer, and update a local revocation DB. Preferably, appliances also periodically communicate with an edge machine for the purpose of checking revocation status for MITM certificates. If an edge region or machine does not have revocation state for the appliance customer's CA certificates, it will check KMI. Once the status is determined, it responds to the appliance device.

When a MITM CA is revoked, all server certificates issued by that CA or a subordinate are cleared from caches, and future sessions to origins protected by those certificates trigger new MITM certificate creation. These new certificates are signed by a newly created $CA_{\{ak\}}'$.

Server Certification revocation may be carried out as follows. In particular, preferably server certificates are not revoked individually. Instead, if compromise of an appliance device is detected, access to the platform from that device is revoked and short-lived certificates expire within the configurable TTL. Unless an edge machine compromise is detected as well, there is no need to revoke any CAs in the trust chain, because (according to the security model) their private keys are never exposed to the appliance device. Short lived $CA_{\{ak\}}'$ private keys are carefully protected on the edge, such that a compromised appliance device cannot access the keys via established communication channels.

TLS Session Termination

Figure 7:
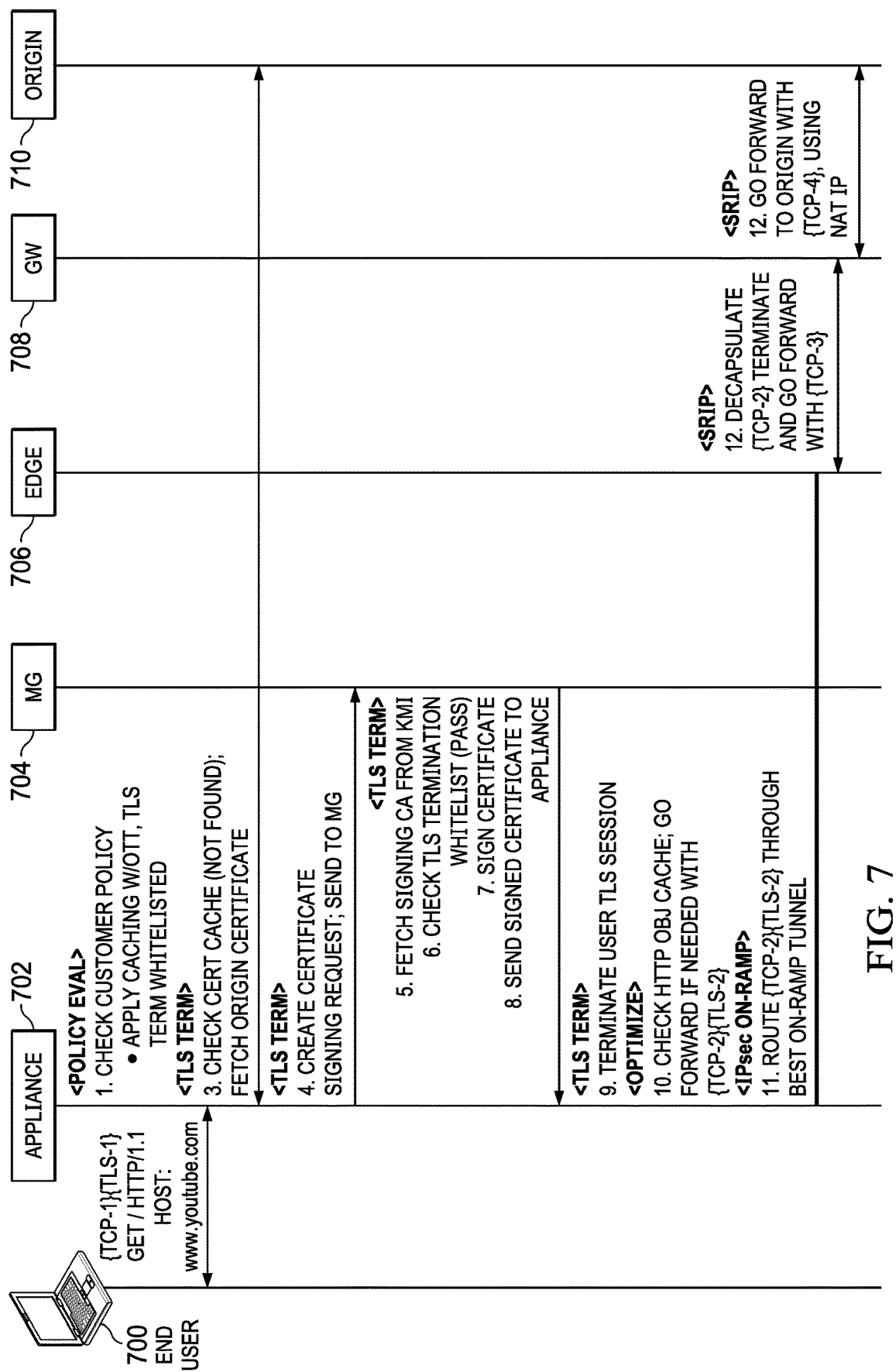
FIG. 7 depicts a representative TLS session termination flow.

The following provides additional details regarding TLS Session Termination Flow. FIG. 7 depicts a representative TL Termination flow diagram.

In this example, an end user client 700 makes a request to overlay network appliance 702. The appliance 702 is associated with a management gateway 704. The edge region 706 and OIP gateway 708 provide transport to an origin 710, all as previously described. As depicted, when the end user makes a request for content, a policy evaluation is performed on the appliance 702. According to the policy evaluation, a customer policy as depicted in enforced. In this example, an origin certificate must be fetched. Once obtained, and according to the policy, a CSR is created and sent to the MG 704. MG 704 receives the CSR and, in response, fetches a signing CA from the key management infrastructure, checks the request against a TLS termination whitelist, signs the certificate if the check is positive, and sends the signed certificate back to the appliance 702. The appliance receives the certificate and, in response, terminates the user TLS session, performs various checks, and then establishes a tunnel to an edge server in the edge reason 706. The remaining paths are then established as depicted.

Thus, FIG. 7 depicts how the endpoint appliance running in an untrusted environment obtains a short-lived certificate (and its associated short-lived private key) and uses the certificate without being exposed to either the customer's managed long-lived CA or the overlay network's long-lived CA. This trust hierarchy greatly reduces the degree of risk to sensitive information upon any compromise of the appliance (or even an edge server). The use of the different CA TTLs (such as depicted in FIG. 6 generally) facilitates risk reduction for the overlay network and its customer with respect to the endpoint appliance. This enables the endpoint appliance to provide significant security and performance optimizations in the manner described.

In the approach herein, the overlay network customer has direct and indirect administrative control over the end user devices that are configured to trust the customer's managed long-lived CA.

Thus, and as depicted, TLS termination is configured as part of appliance policy configuration. When creating policy rules for HTTPS data flows, preferably the service provider portal prompts the user to add the domains associated with the policy to a TLS man-in-the-middle whitelist. Preferably, the overlay network service provider maintains a list of sites that are known to be problematic with the man-in-the-middle mechanism, as well as sites which transit sensitive data (PII, credit card numbers, social security numbers, etc). Domains that are whitelisted by the customer preferably are checked against the CDN-managed lists, and warnings will be displayed to the customer admin.

In one embodiment, and as depicted in FIG. 7, the service focuses on a whitelist-only approach, but this is not a limitation. Coarse rules that enable TLS termination for broad groups of traffic, e.g., all TCP port 443, preferably are not allowed. Instead, customers preferably are required to add domains to the whitelist as they create custom policy rules. Preferably, whitelist checks are enforced on both the appliance prior to creating a man-in-the-middle certificate, and on the MG/NE prior to signing the certificate with the customer's overlay network provider-managed short-lived CA.

Secret distribution has been previously described. The two use cases that are supported to bootstrap TLS termination preferably are as follows. The first use case is that the customer has an existing PKI infrastructure and manages an internal CA root that is already trusted by their devices; the service enables that type of customer to use that CA as the trust root for man-in-the-middle certificates by allowing them to obtain an overlay network long-lived CA certificate, sign it with their CA, and then upload the resulting signed certificate through the portal. The other use case is a customer that does not have PKI infrastructure, in which case the overlay network provides the long-lived certificate (public portion only) to the customer to push to their devices' trust store. In both cases, the overlay network stores the private key for the customer's overlay network provider-managed long-lived CA solely in KMI (or the like). A subordinate customer scoped short-lived CA is generated by KMI, configured with auto rotation, and published to subscribed overlay network edge machines. NEs subscribe to a customer's short-lived CA only when needed to sign a certificate for that customer.

The KMI collections storing long-lived and short-lived secrets are configured such that only the portal is able to read and write, and edge machines are the only other authorized readers. When a customer uploads the long-lived signed certificate as part of the first use case, the overlay network provider validates the certificate chain to verify any certificates signed by the CA will not be trusted by default/public trust stores which ship with browsers and OSes. This is designed to prevent accidental upload only of such a certificate.

The edge delegation mechanism was also described above. In an alternative embodiment, and as depicted in FIG. 7, MG machines may be responsible for certificate signing.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields including distributed networking, Internet-based overlays, WAN-based networking (using MPLS or otherwise), secure utilization of Internet links, and the like, all as described above.

What is claimed follows below:

1. A method to generate a trusted certificate on an endpoint appliance located in an untrusted network, wherein one or more client devices are configured to trust a first Certificate Authority (CA) that is administered by an administrator of the untrusted network, comprising:
    configuring an overlay network in association with the endpoint appliance, the overlay network comprising at least an edge machine located proximate the endpoint appliance, and having associated therewith a key management service;
    activating in the overlay network a second CA distinct from the first CA and in association with the key management service;
    responsive to activating the second CA, creating in the overlay network a third CA distinct from the first CA and the second CA and in association with the edge machine, the third CA configured as a subordinate to the second CA, the first, second and third CAs comprising a trust hierarchy for man-in-the-middle (MITM) termination of secure information flows received at the endpoint appliance;
    dynamically generating and providing the endpoint appliance a server certificate signed by the third CA, the server certificate being used by the endpoint appliance to MITM terminate secure information flows without the endpoint appliance being exposed to either the first CA or the second CA; and
    upon a compromise of the endpoint appliance, revoking access to the overlay network from the endpoint appliance and allowing the server certificate to expire.

2. The method as described in claim 1 wherein the secure information flow is provided over Transport Layer Security (TLS).

3. The method as described in claim 1:
    wherein the server certificate has a time-to-live (TTL) that is shorter than a TTL associated with the third CA;
    wherein the TTL associated with the third CA is shorter than a TTL associated with the second CA; and
    wherein the TTL associated with the second CA is shorter than a TTL associated with the first CA.

4. The method as described in claim 1 wherein the overlay network is a content delivery network (CDN).

5. The method as described in claim 1 wherein the endpoint appliance is located behind an enterprise firewall.

6. The method as described in claim 1 wherein a certificate includes a private key.

7. The method as described in claim 6 further including storing a private key associated with the certificate in a secure repository inaccessible by the endpoint appliance and the edge machine.

8. The method as described in claim 1 wherein the edge machine is one of a set of edge machines co-located at a region of the overlay network proximate the endpoint appliance.

9. The method as described in claim 1 wherein the key management service is located in a secure data center.

10. The method as described in claim 1 wherein the server certificate signed by the third CA is provided over a TLS connection established between the endpoint appliance and the edge machine.

11. The method as described in claim 10 wherein the server certificate is provided in response to receipt at the edge machine of a certificate signing request (CSR) from the endpoint appliance.

12. The method as described in claim 1 further including detecting compromise of the endpoint appliance and, in response, revoking the endpoint appliance access to the overlay network.

13. The method as described in claim 1 wherein the overlay network provides transport of network traffic between the endpoint appliance and an origin server located remote from the endpoint appliance.

* * * * *